United States Patent [19]

Chen et al.

[11] Patent Number: 4,524,050
[45] Date of Patent: * Jun. 18, 1985

[54] CATALYTIC HYDROLYSIS OF CARBONYL SULFIDE

[75] Inventors: Michael S. Chen, Zionsville; Thomas J. Edwards, Allentown, both of Pa.; William R. Ernst, Roswell, Ga.

[73] Assignee: Air Products and Chemicals, Inc., Allentown, Pa.

[*] Notice: The portion of the term of this patent subsequent to Nov. 13, 2001 has been disclaimed.

[21] Appl. No.: 512,288

[22] Filed: Jul. 8, 1983

Related U.S. Application Data

[63] Continuation-in-part of Ser. No. 456,222, Jan. 7, 1983, Pat. No. 4,482,529.

[51] Int. Cl.$^3$ .............................................. C01B 17/00
[52] U.S. Cl. ................... 423/243; 423/437; 423/563; 502/167
[58] Field of Search .......... 423/243, 563, 437, 242 A, 423/242 R, 244 A, 244 R; 502/167

[56] References Cited

U.S. PATENT DOCUMENTS

| | | | |
|---|---|---|---|
| 2,395,509 | 2/1946 | Shaw | 423/243 |
| 3,620,674 | 11/1971 | Renault et al. | 423/243 |
| 3,965,244 | 6/1976 | Sykes, Jr. | 423/228 |
| 3,966,875 | 6/1976 | Bratzler et al. | 423/220 |
| 4,001,066 | 1/1977 | Channing et al. | 156/152 |
| 4,096,085 | 6/1978 | Holoman et al. | 252/189 |
| 4,100,256 | 7/1978 | Bozzelli et al. | 423/243 |
| 4,112,049 | 9/1978 | Bozzelli et al. | 423/229 |
| 4,112,052 | 9/1978 | Sartori et al. | 423/242 |
| 4,351,812 | 9/1982 | Correll et al. | 423/243 |

FOREIGN PATENT DOCUMENTS

461001  2/1937  United Kingdom ................ 423/243

OTHER PUBLICATIONS

Sharma et al., "Absorption of Carbonyl Sulphide in Amines and Alkalis", Chemical Engineering Science, 1964, vol. 19, pp. 991-992.

Sharma, "Kinetics of Reactions of Carbonyl Sulphide and Carbon Dioxide with Amines and Catalysis by Bronsted Bases of the Hydrolysis of COS", Trans. Faraday Society, 1965, vol. 61, pp. 681-687.

*Primary Examiner*—Gregory A. Heller
*Attorney, Agent, or Firm*—Mark L. Rodgers; E. Eugene Innis; James C. Simmons

[57] ABSTRACT

Hydrolysis of COS in gas streams to $H_2S$ and $CO_2$ can be improved by using certain bicyclo tertiary amine catalysts. Bicyclo tertiary amine catalysts can enhance COS hydrolysis in an acid gas removal solvent in the liquid phase or on a solid support system in the gas phase.

18 Claims, No Drawings

CATALYTIC HYDROLYSIS OF CARBONYL SULFIDE

CROSS REFERENCE TO PARENT APPLICATION

This is a continuation-in-part of Ser. No. 456,222 filed 7 Jan. 1983, now U.S. Pat. No. 4,482,529.

TECHNICAL FIELD OF THE INVENTION

The present invention relates to catalytic hydrolysis of carbonyl sulfide (COS).

BACKGROUND OF THE INVENTION

The removal of carbonyl sulfide (COS) from mixtures of gases by liquid absorbents is an important industrial operation. Refinery and synthetic gases, derived from either petroleum fractions or coal, often contain significant amounts of COS. The manufacture of olefins, notably $C_2H_4$ and $C_3H_6$, from petroleum fractions also entails absorption of COS because of the close boiling points of COS and $C_3H_6$. It is necessary to remove COS down to a few ppm for several reasons, such as catalysts sensitivity to COS in subsequent operations, statutory regulations regarding sulfur content in vent gas, and corrosion aspects of sulfur compounds in pipelines. In addition, the presence of COS has been identified as the cause of nonreversible degradation reactions in several commercial acid gas removal processes. This necessitates additional capital and energy costs for reclaiming and/or replacing the resulting spent solvent.

COS can be absorbed along with $H_2S$ and $CO_2$ in a variety of chemical and physical solvents. Sykes, U.S. Pat. No. 3,965,244, Bozzelli, et al. U.S. Pat. No. 4,100,256, and U.S. Pat. No. 4,112,049, all teach the use of chemical solvents to hydrolize COS. The prime examples of chemical solvents are aqueous solutions of primary and secondary amines such as monoethanol amine (MEA) and diethanol amine (DEA), respectively. While COS can be removed from the gas effectively by these chemical solvents, it generally degrades the solvents by forming undesirable stable compounds such as thiocarbonates, as in the case of MEA and DEA. Substantial thermal energy is required to regenerate the spent solvents, thereby increasing processing costs.

The trend in the art has been to employ physical solvents in place of these chemical solvents. Physical solvents do not have the disadvantage of forming undesirable stable compounds as discussed above, and can absorb more gas under pressure than chemical solvents. Physical solvents such as polyethylene glycol dimethyl ether, sold under the tradename Selexol, and cold methanol, sold under the tradename Rectisol, remove acid gases based on the principle of physical absorption, i.e. Henry's Law. When used alone however, physical solvents are often inadequate, especially when used in coal gasification operations where large amounts of COS are present.

To overcome this drawback, current commercial practice is to effect gas phase COS hydrolysis over a suitable catalyst. Catalysts such as Pt on $Al_2O_3$ have been employed for this hydrolysis. For example, COS will hydrolyze partially over CO shift catalysts in the presence of sufficient steam (0.1 mole steam/mole of gas) at high temperatures; e.g., 120°-300° C. There are two problems with this type of process however. First, COS hydrolysis is incomplete and limited by the equilibrium of the reaction if $H_2S$ and $CO_2$ are not removed. Second, if $H_2S$ and $CO_2$ are removed first at lower temperature, the gas stream would have to be heated up for COS hydrolysis, followed by another step for $H_2S$ removal. This procedure is costly due to the large energy requirement.

European patent application No. 0,008,449 discloses adding a monocyclic amine catalyst to an aqueous solvent to effect COS hydrolysis. Operation of this method however requires a high concentration of catalyst; up to 90% for example; and is only effective when small amounts of COS are present. This method also has the disadvantage in that unwanted salts tend to form from the contact of the hydrolysis products with the excess monocyclic catalysts.

U.S. Pat. Nos. 3,966,875 and 4,011,066 disclose using homogeneous catalysts in physical acid gas removal solvents. These references however only disclose using mono-cyclic amine catalysts such as 1,2-dimethylimidazole, and teach using separate hydrolysis and absorption towers. These mono-cyclic catalysts have only moderate activity for COS hydrolysis.

Holoman, et al. U.S. Pat. No. 4,096,085 discloses adding a bicyclo tertiary amine to an acid gas scrubbing system. This reference teaches adding a small amount of bicyclo amine to a chemical solvent to inhibit corrosion in the system. We have demonstrated that it takes a larger concentration of the bicyclic amine than is disclosed in this reference to effect COS hydrolysis. In addition, Holoman only teaches adding these compounds to chemical acid gas removal solvents.

SUMMARY OF THE INVENTION

It has now been found that COS hydrolysis to $H_2S$ and $CO_2$ can be improved by using bicyclo tertiary amine catalysts. Bicyclo tertiary amine catalysts can enhance COS hydrolysis in an acid gas removal solvent in the liquid phase or on a solid support system in the gas phase.

DETAILED DESCRIPTION OF THE INVENTION

A process for the hydrolysis of COS to $H_2S$ and $CO_2$ is effected when refinery, synthesis or other COS containing gases are contacted with certain bicyclo tertiary amines.

The compounds which have been found to enhance COS hydrolysis are bicyclo tertiary amines having the general formula:

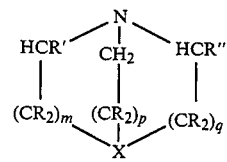

wherein X represents H—C or N; R and R' represent H, $CH_3$— or $CH_2H_5$—; R" represents H or $CH_3$— only if R' is not $C_2H_5$; and m, p and $q \geq 1$; and bicyclo amidines having the general formula

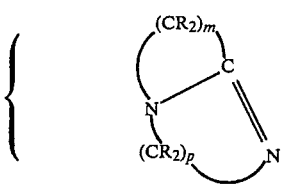

wherein R represents H, CH$_3$— or C$_2$H$_5$—, m is 3, 4 or 5 and p is 2, 3 or 4.

The exact mechanism by which COS hydrolysis is catalyzed by these bicyclic tertiary amines is not fully understood. The use of these compounds as catalysts for hydrolysis however, can result in complete elimination of COS in the process stream. One possible reason for the superior catalytic activity of these compounds is that their unique bicyclic structure provides for easy access to the catalytic site.

These compounds are effective to enhance COS hydrolysis in both chemical and physical acid gas removal solvents in the liquid phase, although physical solvents are generally preferred. Examples of such physical solvents include dimethyether of polyethylene glycols, PEG 400, Propylene carbonate, N-$\beta$-hydroxyethyl morpholine, N-methyl-2-pyrrolidone, methanol, sulfolane, tributyl phosphate and water.

The COS containing gas is typically contacted with an acid gas removal solvent containing one or more of the above compounds in an absorption tower in a typical acid gas scrubbing system. Hydrolysis occurs in-situ following the physical absorption of COS in the solvent under nonextreme conditions of temperature and pressure. Since the resulting hydrolysis products, H$_2$S and CO$_2$, usually have widely differing solubilities in the conventional acid gas physical solvents, sulfur removal can be accomplished efficiently.

Since the process of the present invention operates with a wide variety of solvents, the operating conditions of the process are widely varied. Generally, the pressure should be in a range of about 1 to 136 atmospheres for the acid gas containing streams and for the absorber and desorber. The preferred range would be about 1 to 82 atmospheres. The temperature range should be between the freezing and boiling points of the solvents. This is between about −20° C. and 350° C., with a range of about −10° C. to 200° C. being preferred. The catalysts should be present in a concentration of about at least 0.02 to 8 g-mole/l, with a concentration of about 0.05 to 1 g-mole/l being preferred. Water should be present in the solvent system in a concentration of 0.1 to 60 wt. % with a preferred concentration from about 0.5 to 10 wt. %.

It was found that these catalysts, when added to a solvent, enhanced the solubility of either or both H$_2$S and CO$_2$ such that the solvent capacity and/or selectivity is improved. The catalysts involved in the claimed process can be utilized in any gas removal solvent and in any process scheme designed for H$_2$S and/or CO$_2$ removal to achieve the benefits listed above.

The present invention is superior to the processes of U.S. Pat. Nos. 3,966,875 and 4,011,066 in that the bicyclic amine catalysts of the invention show significantly more activity than the monocyclic catalysts of the above-cited references. The present invention also allows for a single step process whereas the cited references involve separate hydrolysis and absorption steps.

These bicyclo tertiary amines can catalyze COS hydrolysis at low temperatures; between about 20° to 100° C.; in the gas phase. By this method a COS hydrolysis unit loaded with bicyclo tertiary amines supported on a suitable solid packing material can be used to hydrolize COS either before the gas enters the absorber or after the gas is partially scrubbed of H$_2$S, CO$_2$, and COS. In the latter case, the gas after the hydrolysis treatment is returned to the absorber for removing the rest of the acid gases. As is the case with liquid phase hydrolysis as described above, these bicyclo tertiary amines, because of their unique structure, catalyze COS hydrolysis effectively without forming degradation products with H$_2$S and CO$_2$.

The bicyclo tertiary amine catalysts in the hydrolysis column can be supported on any type of solid support system known in the art. The solid support system should be chemically inert, high surface area particles which are able to support and retain the catalysts while not being washed away with the solvents. Typical examples of this type of solid supports are porous glass and porous alumina beads.

COS hydrolysis takes place at temperatures in the range from about 20° to 100° C. This range is considerably lower than the necessary ranges for the prior art gas phase hydrolysis systems. The pressure of the system is preferably adjusted so as to approximate the feed gas pressure, although wide variations can be tolerated. Typically, the system operates at pressures ranging from about 1 to 70 atmospheres.

The catalyst should be present in a concentration such that the weight ratio of catalyst to solid support material is anywhere from between about 0.0005 to 1.0. Water should be present in the system in an amount at least about equal to the stoichiometric amount of COS. Since the water content of the inlet gas is usually several times the stoichiometric amount of COS, the need for injecting steam into the system as described in the prior art, is typically eliminated.

Gas phase hydrolysis renders a higher gas throughput and higher removal rate than liquid phase hydrolysis because of lower pressure drop and the absence of the liquid phase mass transfer resistance. This process also permits a higher catalyst load per unit reactor volume while avoiding potential catalyst loss in the solvent regeneration column.

As compared to the current gas/solid COS hydrolysis methods, the present method requires little or no steam to be added to the system. This is due to the fact that sufficient H$_2$O for hydrolysis is present in the feed gas, and, since hydrolysis takes places at lower temperatures, excess steam for heating is not required. This also eliminates or reduces the need for cooling the stream before it it returned to the solvent system for further scrubbing. Since the degree of hydrolysis is limited by the equilbrium, and the reaction is exothermic, the higher the temperature in the system, the lower the maximum achievable conversion. The present low temperature hydrolysis method, therefore, can achieve a higher conversion of COS than the high temperature processes of the prior art.

The following examples are illustrative of the process of the present invention and are not intended to be limiting.

RESULTS

EXAMPLE 1

A gas mixture of CH$_4$, CO$_2$, H$_2$S, COS (approx. 1% each) and He were injected into 160 ml glass bottles at a rate of 150 ml/min. until the outlet and inlet gas compositions were identical. Each bottle was then charged with a measured amount of solvent (32 ml, 3 wt.% $H_2O$) with and without catalyst by a syringe through the septum while an equal volume of gas was displaced through another syringe. The bottles were then immediately placed on a shaker at room temperature (17°–20° C.) for a period of time (approx. 30 min.) for the reaction to take place. Gas samples were taken for GC analysis.

For each solvent-catalyst pair, a blank run (without the catalyst) was also made to provide a baseline for comparison. The net amount of COS removal from the gas phase over and above the pure physical absorption from the blank run was used to calculate the catalyst hydrolysis activity, defined as follows:

$$\text{Catalyst activity (min-M)}^{-1} = \frac{\ln\left[\frac{COS(t) \text{ without catalyst}}{COS(t) \text{ with catalyst}}\right]}{(\text{catalyst conc.}) (\Delta t)}$$

Where
COS (t) without catalyst = gas phase COS concentration at time t without catalyst in the solvent COS (t) with catalyst = gas phase COS concentration at time t with catalyst in the solvent.

$\Delta t$ = time, in minutes, of gas/liquid contact in the bottles.

Catalyst conc. = catalyst concentration in the solvent varying from 0.1 to 1 M (i.e. g-mole/l)

The catalysts and solvents used were as follow:

| Catalysts | Molecular Wt. (MW) | $pk_B$ at 25° C. |
|---|---|---|
| C1 Quinclidine | 111.2 | 3.5 |
| C2 1,4-Diazabicyclo[2,2,2]-Octane (sold under the trademark DABCO by Air Products and Chemicals, Inc.) | 112.2 | 5.4 |
| C3 1,5-Diazabicyclo[5,4,0]-Undec-5-ene | 152.2 | 1.6 |
| C4 1,5-Diazabicyclo[4,3,0]-non-5-ene | 124.2 | 1.3 |
| C5 1,2-Dimethylimidazole | 82.11 | 6.3 |

| Solvents | Molecular Wt. | Freezing Point °C. | Boiling Point °C. |
|---|---|---|---|
| S1 Dimethylether of polyethylene glycols (Selexol) | 280 | −22.2 to −28.9 | — |
| S2 Polyethylene glycol (PEG 400) | 400 | — | — |
| S3 Propylene carbonate | 102 | −49.2 | 241.7 |
| S4 N—β-Hydroxyethyl morpholine | 131.2 | — | 225.5 |
| S5 N—Methyl-2-pyrrolidone | 99.1 | −24 | 202 |
| S6 Methanol | 32 | −47.8 | 64.5 |
| S7 Sulfolane (tetrahydrothiophene dioxide) | 120.2 | 27 | 285 |
| S8 Tributyl phosphate | 266.32 | −80 | 292 |
| S9 Water | 18 | 0 | 100 |

The results of this experiment for the five catalysts in nine common physical solvents are shown in Table 1 below.

TABLE 1

Summary of 5 Tertiary Amines' Catalytic Activities in 9 Common Physical Solvents from Bottle Shaker Tests at Known Temperatures

| | Solvent | Activity (min-M)$^{-1}$ | | | | |
|---|---|---|---|---|---|---|
| | | C1 | C2 | C3 | C4 | C5 |
| S1 | Selexol Brand | 54 | .39 | 2.7 | 2.3 | .17 |
| S2 | PEG 400 | .08 | .20 | .19 | >.19 | .03 |
| S3 | Propylene Carbonate | >.33 | .33 | .07 >.07 | .07 | |
| S4 | N—β-Hydroxyethyl Morpholine | .12 | .02 | >.12 | >.12 | 0 |
| S5 | N—Methyl-2 pyrrolidone | 2.10 | 1.37 | >2.1 | >2.1 | .23 |
| S6 | Methanol | 1.66 | .19 | >1.66 | >1.66 | .78 |
| S7 | Sulfolane | 1.38 | .58 | >1.38 | >1.38 | 0 |
| S8 | Tributyl Phosphate | .62 | .46 | >.62 | >.62 | .01 |
| S9 | Water | .75 | .10 | .78 | .81 | .03 |
| Overall | Ranking | 3 | 4 | 1 | 2 | 5 |

These results clearly demonstrate that these catalysts are capable of hydrolyzing COS in a wide variety of commonly used physical solvents. It was also found that the catalyst activity tends to decrease with increasing $pK_B$ values. C1 to C4, the catalysts used in the claimed process, showed significantly higher activity than C5, 1,2-dimethylimidazole.

EXAMPLE 2

To demonstrate the improvement of the catalysts in physical solvents for COS removal from a gas in a more typical scrubbing system, applicants ran experiments in a laboratory packed column operated under a gas-liquid countercurrent mode using DABCO (C2) catalyst in Selexol solvent (S1). The operating conditions were:
Column = 1" diameter × 42" packed height
Packing material = 0.12" stainless steel packing
Inlet Gas Composition = 1% COS in bulk $CO_2$
Pressure = 1 atm
Inlet Liquid = Selexol with 2.5 wt.% $H_2O$ with and without DABCO (C2) catalyst The packed column was run partially flooded with solvent, that is, the column was initially filled with the solvent to a predetermined height, then the gas was introduced at the bottom to expand the liquid to the top of the column. The gas passed up the column with discrete gas bubbles when the liquid ran down as a continuous phase. The results of several operating conditions are set out in Table 2.

TABLE 2

| Run # | (C2) DABCO Catalyst conc. M | Liq. Temp. °C. | Flow rate Gas | cm³/min. Liq. | COS conc. In | % vol. Out | % COS Removal |
|---|---|---|---|---|---|---|---|
| 19-1 | 0 | 21 | 802 | 13.06 | 1.093 | 0.975 | 10.8 |
| 20-2 | 0 | 23 | 793 | 13.06 | 1.091 | 0.966 | 11.5 |
| 17-1 | 0.2 | 22 | 801 | 13.06 | 1.091 | 0.933 | 14.6 |
| 20-1 | 0.0 | 23 | 790 | 8.4 | 1.084 | 1.03 | 5.0 |
| 19-2 | 0.0 | 23 | 797 | 8.4 | 1.093 | 1.035 | 5.3 |
| 18-1 | 0.2 | 21 | 807 | 8.4 | 1.087 | 0.984 | 9.5 |
| 23-1 | 0.0 | 49 | 804 | 13.06 | 1.080 | 0.994 | 8.0 |
| 25-1 | 0.2 | 50 | 805 | 13.06 | 1.087 | 0.868 | 20.2 |
| 24-1 | 0.0 | 49 | 804 | 8.4 | 1.085 | 1.034 | 4.7 |
| 26-1 | 0.2 | 50 | 800 | 8.4 | 1.081 | 0.907 | 16.1 |

These results show that the addition of DABCO catalyst (C2) to a physical acid gas removal solvent greatly enhances COS removal, especially at higher temperatures.

EXAMPLE 3

To further demonstrate catalyst effectiveness in removing COS from a gas, applicants ran experiments in a flow reactor in which a COS-containing gas was sparged through a liquid pool under stirring.

Catalyst = DABCO (C2)
Solvent = N-methyl-2-pyrrolidone (S5) with 2.5 wt.% $H_2O$
Liq. volume = 150 ml
Gas composition = 1.6 to 2% COS, 2.2% $CH_4$ and bulk He with trace $CO_2$
Temp = 25° C.
Pressure = 1 atm

TABLE 3

| Run # | Conc. M | Gas Composition ($\frac{\text{mole COS}}{\text{mole CH}_4}$) In | Out | % COS Removal |
|---|---|---|---|---|
| 6 | 0 | 0.74 | 0.54 | 27 |
| 3 | 0 | 0.75 | 0.51 | 32 |
| 4 | 0.06 | 0.74 | 0.35 | 52 |
| 5 | 0.18 | 0.74 | 0.19 | 74 |
| 1 | 0.25 | 0.75 | 0.14 | 81 |
| 2 | 1.94 | 0.75 | 0.026 | 97 |

This example illustrates that the solvent itself possesses COS hydrolysis activity but, with the addition of the catalyst, COS removal is increased through additional hydrolysis.

EXAMPLE 4

Similar to the flow reactor experiments in Example 3, applicants ran experiments with C4 catalyst in Selexol solvent (S1).

Catalyst = 1.5 Diazabicyclo[4,3,0]non-5-ene (C4)
Solvent = Selexol (S1) with 2.5 wt.% $H_2O$
Liquid volume = 250 ml
Gas rate = 150 ml/min
Inlet Gas composition = 1% COS in bulk $CO_2$
Temperature = 20°-25° C.
Pressure = 1 atm

TABLE 4

| | Cat Con. M | % COS Removal | Time of Steady-State Hours |
|---|---|---|---|
| #1 | 0 | 0 | 7.5 |
| #2 | 0.2 | 40-60 | 152 |

This example illustrates that this particular solvent itself has no hydrolysis activity but with 0.2M of catalyst concentration COS removal is increased solely due to the presence of the catalyst.

EXAMPLE 5

This test was run to determine if, under the conditions of U.S. Pat. No. 4,096,085 where bicyclo tertiary amines were added as corrosion inhibitors, there would be any significant COS hydrolysis due to the addition of these compounds.

The concentration ranges of U.S. Pat. No. 4,096,085 are 10–15 wt.% bicyclo amine, (C2), in the inhibitor formulation and 10 to 2000 ppm of inhibitor in the aqueous MDEA or DEA solution.

The typical concentration of aqueous MDEA or DEA is in the range of 30 to 50 wt.%, so the maximum bicyclo amine concentration added as a corrosion inhibitor in these solutions can be calculated as follows:

Max bicyclo amine wt. Concentration = (50 wt%) (2000 ppm) = (0.5) (2000 × 10$^{-6}$) = 0.001 = 0.1%

At this concentration, the molar concentration in our typical solvent; 2.5 wt% $H_2O$ in Selexol; can be calculated as follows:

$$\text{Bicyclo amine molar concentration} = \left(\frac{0.001 \text{ g (C2)catalyst}}{\text{g solvent}}\right)\left(\frac{1 \text{ g-mole}}{112.17 \text{ g}}\right)\left(\frac{1000 \text{ g solvent}}{1 \text{ solvent}}\right) = 0.00892 \text{ g-mole Bicyclo amine/l solvent}$$

This concentration is very close to our experiment using 0.01M (i.e. g-mole/l) DABCO catalyst, (C2), in 2.5 wt.% $H_2O$/Selexol solvent, (S1), in shaking bottle tests. The results of this run at 27° C. and 0.5 hour shaking time are reported in Table 5 below:

TABLE 5

| GAS COMPOSITION ($\frac{\text{Mole Species}}{\text{Mole CH}_4}$) | | | | |
|---|---|---|---|---|
| | $H_2O$ in Selexol Solvent | | 0.01M DABCO catalyst in the same | |
| Gas Conc. | 0 Hr. | ½ Hr. | 0 Hr. | ½ Hr. |
| Air | 0.17 | 5.86 | 0.14 | 2.56 |
| $CH_4$ | 1.0 | 1.0 | 1.0 | 1.0 |
| $CO_2$ | 0.90 | 0.63 | 0.91 | 0.57 |
| $H_2S$ | 1.00 | 0.07 | 1.07 | 0.12 |
| COS | 1.32 | 0.42 | 1.33 | 0.41 |
| $H_2O$ | — | 2.87 | — | 2.79 |

It is clear from the above table that 0.01M DABCO catalyst in the solvent did not contribute any COS removal over and above what the solvent can absorb through the normal gas solubility.

EXAMPLE 6

A C2/alumina beads column for gas phase COS hydrolysis was prepared as follows:

32 grams of C2 was dissolved in 200 ml acetone and then mixed with 400 grams of alumina beads. The mixture was transferred to a steel pan on a shaker for about 8 hours at ambient condition. It was then transferred to a gas saturator with $N_2$ purging over the beads for 2.5 days. The beads were then weighed to give a total weight of 435.8 gms (about 4.8 gms acetone was still trapped).

Assuming all the C2 was on the beads, we have 0.08 gm C2 per gm beads. 418.1 gm of this material (containing 30.97 gm C2) was then packed into a 1" × 41" long glass column.

The alumina beads used in this study was obtained from Rhone-Poulenc Chem Div. (P.O. Box 125, Monmouth Junction, NJ 08852) with the following properties:

| Chemical Analysis (wt. %) | |
|---|---|
| Loss on ignition | 3 to 5 |
| $Na_2O$, water soluble | 0.4 |
| $Na_2O$, total | 0.6 |
| $SiO_2$ | 0.02 |
| $Fe_2O_3$ | 0.04 |
| $TiO_2$ | 0.01 |
| $Al_2O_3$ | 94 |

-continued

| Physical Properties (2-5 mm balls) | |
|---|---|
| Sp. gr. g/cm$^3$ | 3 |
| Bulk density, g/cm$^3$ | 0.77 (48 lb/ft$^3$) |
| Micropore volume, cm$^3$/100 g | 40 |
| Specific surface, m$^2$/g | 345 |
| Attrition loss % | 0.3 |
| Crushing strength, Kg | 13 |
| Pore diameters at 20 Å and 40-50 Å | |

EXAMPLE 7

In order to determine the extent to which COS hydrolysis is catalyzed by the bicyclo tertiary amine and not by the alumina alone, runs were made using a blank alumina bead column as a control, run 1, and using an 8 g C2/100 g alumina bead column prepared according to example 6; run 2. The runs were conducted at a column temperature of 20° C. and a pressure of 1 atmosphere. Feed gas containing COS was passed through a water saturator to pick up $H_2O$ for COS hydrolysis before entering the column. The operating conditions for the runs were as follows:

| Run 1 | Run 2 |
|---|---|
| 387.78 gm alumina | 411.2 gm C2/alumina beads (30.46 gm C2) |

Operating Conditions

Gas flow 3258.4 ml/min. containing 1.01% COS (balance $CO_2$)

Liquid flow 3339.8 ml./min.

Column Temp.=20° C.

Water Saturator Temp.=32.2° C.

The results of these two runs are shown in Table 6 below.

TABLE 6

| Cumulative Gas Flow Through Column ($10^2$ l) | % COS Removed | |
|---|---|---|
| | Run 1 | Run 2 |
| 0 | 82 | 93 |
| 5 | 49 | 83 |
| 10 | 28 | 70 |
| 15 | 13 | 55 |
| 20 | 0 | 52 |
| 25 | 0 | 35 |
| 30 | 0 | 24 |
| 35 | 0 | 11 |

TABLE 6-continued

| Cumulative Gas Flow Through Column ($10^2$ l) | % COS Removed | |
|---|---|---|
| | Run 1 | Run 2 |
| 40 | 0 | 0 |

The above results show that, while the alumina beads alone can effect COS hydrolysis, the activity is lower and declines more rapidly than with the C2/alumina beads. The useful life of the alumina beads alone is only about half that of the C2/alumina beads. One possible reason for the short useful life of the alumina beads is that the COS removal may be due to sorption rather than hydrolysis, and upon saturation of the beads, COS can no longer be absorbed.

The causes of deactivation of the C2/alumina bead column has not been determined but it is suspected that the moisture condensation/adsorption on the activated porous alumina beads is the prime cause. The condensed/adsorbed $H_2O$ at the pore mouth may increase the resistence to COS transport to the catalyst site.

The catalyst/alumina bead column can be reactivated by purging with dry $N_2$ at about 70° to 100° C. for about 5 hours.

EXAMPLE 8

The effect of water vapor pressure on COS hydrolysis with the alumina beads alone and with the C2/alumina beads was determined. Porous alumina beads impregnated with about 8 wt. % C2 catalyst and alumina beads without any catalyst were packed in separate 1"×41" glass columns. A dry feed gas containing about 1% COS in $CO_2$ was passed through a water saturator to pick up the water before entering the packed columns. The inlet and outlet gas compositions were analyzed by gas chromotography. The operating conditions and results are reported in Table 7.

TABLE 7

| | C2/Alumina Beads | | | Alumina Beads Only | | |
|---|---|---|---|---|---|---|
| | Run 1 | Run 2 | Run 3 | Run 4 | Run 5 | Run 6 |
| Amount of Packing, grams | 380 | 394 | 411 | 390 | 390 | 390 |
| Column T °C. (±2° C.) | 50 | 50 | 50 | 50 | 50 | 50 |
| Column P atm. | | | | | | |
| Inlet | 1.175 | 1.084 | 1.080 | 1.103 | 1.074 | 1.063 |
| Outlet | 1.163 | 1.073 | 1.072 | 1.088 | 1.059 | 1.049 |
| Pressure drop | 0.012 | 0.011 | 0.008 | 0.015 | 0.015 | 0.014 |
| Gas Flow Rate, L/min. | 6.5 | 6.5 | 6.5 | 6.5 | 6.5 | 6.5 |
| Inlet COS % (vol.) in $CO_2$ | 1.06 | 1.07 | 1.06 | 1.03 | 1.06 | 1.08 |
| Water Saturator T °C. | 50 | 35 | 21 | 48 | 34 | 18 |
| P $H_2O$ atm. | 0.122 | 0.056 | 0.024 | 0.110 | 0.052 | 0.020 |
| Vol. % (inlet max.) | 10.4 | 5.2 | 2.2 | 10.0 | 4.9 | 1.9 |
| Steady State COS % Removal | 5 | 60 | 95 | 14 | 38 | 68 |

The above results show that the amount of water present has a great effect on COS hydrolysis. The COS hydrolysis rate decreases as the water vapor pressure increases. The hydrolysis reaction appears to have a maximum rate at about 2% $H_2O$ in the feed gas. This can be qualitatively explained by the fact that the porous alumina beads are a strong sorbent for the water. Too much water; i.e. above about 2% volume inlet maximum; blocks or reduces the available active sites for COS molecules. As the amount of water drops below about 2% volume inlet maximum, the reaction rate begins to depend on the availability of water and decreases accordingly.

Comparing the steady state COS % removal for the runs using C2/alumina beads; runs 1-3; with the runs using only alumina beads; runs 4-6; further demonstrates the increased hydrolysis activity contributed by the presence of the bicyclo tertiary amine catalyst; i.e. 95% COS removal in run 3 compared to 68% COS removal under similar conditions in run 6.

Having thus described the present invention, what is now deemed appropriate for Letters Patent is set out in the following appended claims.

What is claimed is:

1. A process for hydrolyzing COS present in a gas stream to H$_2$S and CO$_2$ under conditions necessary to effect said hydrolysis which comprises contacting said gas stream with a bicyclo tertiary amine catalyst having the general formula:

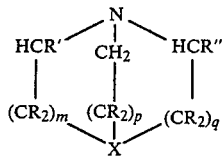

wherein X represents H—C or N; R and R' represent H, CH$_3$— or C$_2$H$_5$—; R" represents H or CH$_3$— only if R' is not C$_2$H$_5$; and m, p and q $\geq$ 1.

2. The process in accordance with claim 1, wherein X represents H—C; R, R' and R" represent H; and m, p and q represent 1.

3. The process in accordance with claim 1, wherein X represents N; R, R' and R" represent H; and m, p and q represent 1.

4. A process for hydrolyzing COS present in a gas stream to H$_2$S and CO$_2$ under conditions necessary to effect said hydrolysis which comprises contacting said gas stream eith a bicyclo tertiary amidine catalyst having the general formula:

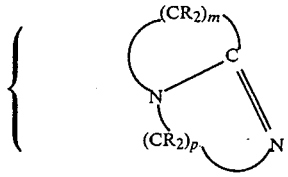

wherein R represents H, CH$_3$— or C$_2$H$_5$—; M is 3, 4 or 5; and p is 2, 3 or 4.

5. The process in accordance with claim 4, wherein R represents H; m=5 and p=3.

6. The process in accordance with claim 4, wherein R represents H; m=3 and p=3.

7. A process for the gas-phase hydrolysis of COS present in a gas stream to H$_2$S and CO$_2$ which comprises contacting said gas stream with a solid supported bicyclo tertiary amine catalyst wherein said bicyclo tertiary amine is present in a concentration such that the weight ratio of catalyst to solid support material is between 0.0005 to 1.0, said bicyclo tertiary amine having the general formula:

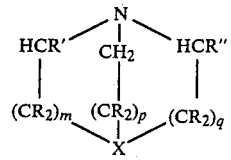

wherein X represents H—C or N; R and R' represent H, CH$_3$— or C$_2$H$_5$—; R" represents H or CH$_3$— only if R' is not C$_2$H$_5$; and m, p and q $\geq$ 1.

8. The process in accordance with claim 7, wherein X represents H—C; R, R' and R" represent H; and m, p and q represent 1.

9. The process in accordance with claim 7, wherein X represents N; R, R' and R" represent H; and m, p and q represent 1.

10. The process in accordance with claim 7, wherein the hydrolysis is run at a temperature in the range from about 20° to 100° C.

11. The process in accordance with claim 7, wherein the hydrolysis pressure is adjusted to approximate the feed gas pressure.

12. The process in accordance with claim 7, wherein water vapor pressure is about 2% of the total vapor pressure of the system.

13. A process for the gas-phase hydrolysis of COS present in a gas stream to H$_2$S and CO$_2$ which comprises contacting said gas stream with a solid supported bicyclo tertiary amidine catalyst wherein said bicyclo tertiary amidine is present in a concentration such that the weight ratio of catalyst to solid support material is between 0.0005 to 1.0, said bicyclo tertiary amidine having the general formula:

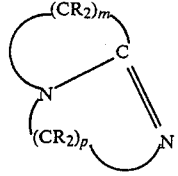

wherein R represents H, CH$_3$— or C$_2$H$_5$—; m is 3, 4, or 5; and p is 2, 3 or 4.

14. The process in accordance with claim 13 where in R represents H; m=5 and p=3.

15. The process in accordance with claim 13, wherein R represents H; m=3 and p=3.

16. The process in accordance with claim 13, wherein the hydrolysis is run at a temperature in the range from about 20° to 100° C.

17. The process in accordance with claim 13, wherein the hydrolysis pressure is adjusted to approximate the feed gas pressure.

18. The process in accordance with claim 13, wherein water vapor pressure is about 2% of the total vapor pressure of the system.

* * * * *

UNITED STATES PATENT AND TRADEMARK OFFICE
CERTIFICATE OF CORRECTION

PATENT NO. : 4,524,050

DATED : June 18, 1985

INVENTOR(S) : Michael S. Chen et al

It is certified that error appears in the above-identified patent and that said Letters Patent is hereby corrected as shown below:

Column 3
    Delete large bracket to left of drawing

Column 6, Line 7
    Delete "54" under C1 and substitute therefor -- .54 --

Column 6, Line 9
    Delete ".07" under C4 and insert under C5 -- .07 --

Insert -- $>$.07 -- under C4

Column 6, Line 10
    Insert -- Carbonate -- under Solvent Column

Delete " $>$.07" under C3

Column 6, Line 11
    Delete "Carbonate" under Solvent Column

Column 10, Line 22
    Delete "$H_{21}O$" and substitute therefor -- $H_2O$ --

Column 11, Line 39
    Delete "eith" and substitute therefor -- with --

UNITED STATES PATENT AND TRADEMARK OFFICE
CERTIFICATE OF CORRECTION

PATENT NO. : 4,524,050

DATED : June 18, 1985

INVENTOR(S) : Michael S. Chen et al

It is certified that error appears in the above-identified patent and that said Letters Patent is hereby corrected as shown below:

Column 11, under Claim 4
  Delete large bracket to left of drawing

Signed and Sealed this

Seventeenth Day of December 1985

[SEAL]

*Attest:*

*Attesting Officer*

DONALD J. QUIGG

Commissioner of Patents and Trademarks